May 27, 1930.  J. F. WAIT  1,760,095
HEATING PROCESS
Filed July 26, 1923
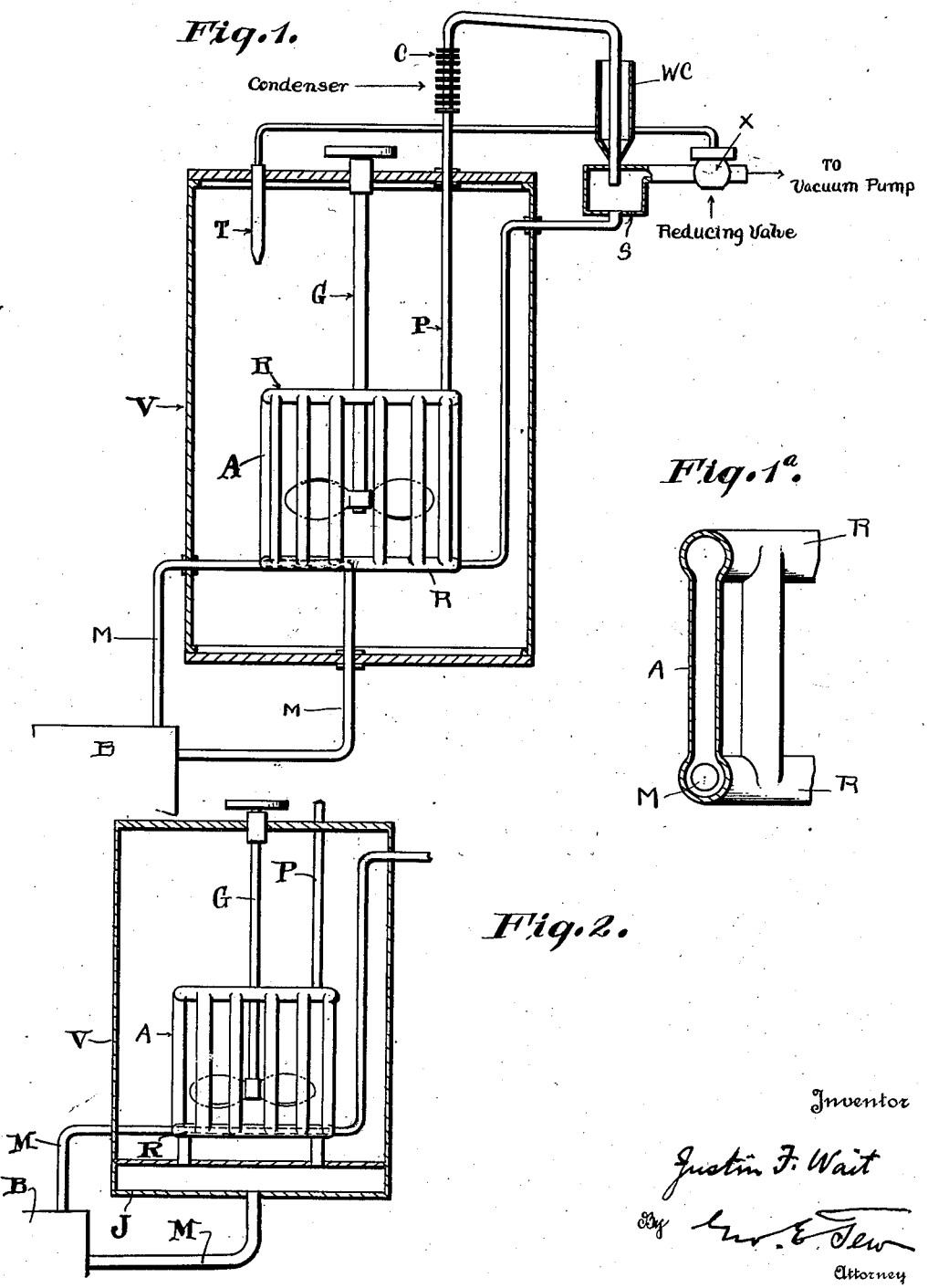

Patented May 27, 1930

1,760,095

UNITED STATES PATENT OFFICE

JUSTIN F. WAIT, OF NEW YORK, N. Y., ASSIGNOR TO SUN OIL COMPANY, OF PHILADELPHIA, PENNSYLVANIA, A CORPORATION OF NEW JERSEY

HEATING PROCESS

Application filed July 26, 1923. Serial No. 654,054.

In processes of indirect heating for the purpose of executing any high temperature operation, it is known to heat a metal, such as mercury, to the boiling point at one region, to flow the metallic vapors to another region into heat exchange relation with the liquid to be treated, so as to effect, by heat exchange with the liquid, condensation of the metallic vapors, and to return the condensate to the region of boiling.

My invention utilizes this known principle, but embodies various novel features. It has for its principal objects rapidity of heating and cooling and precision of control. My process comprises, as heretofore, heating, preferably boiling, a metal at one region in a circulating system, transferring heat from the circulating metal fluid so as to effect its condensation at another region of the system, and returning the condensate to the first region; but instead of transferring the heat directly to the ultimate substance to be heated, the heat is transferred to another body of vaporizable metal in another, or secondary, circulating system, which in turn transfers heat to the ultimate substance to be heated. My invention also contemplates the maintenance of the fluid metal in the secondary circulating system under a pressure less than atmospheric. My invention also contemplates the automatic control of the absolute pressure in the secondary circulating system by the temperature of the ultimate substance being heated. The process also contemplates the condensation of vapors in the secondary circulating system that are not condensed by exchange of heat with the ultimate substance being heated. My invention is also applicable to effect the cooling, as well as the heating, of said substance; one advantageous adaptation of which comprises provisions for such reverse transfer of heat when the substance to be ultimately heated becomes overheated, the effect of which is to prevent any such overheating to a substantial degree. My invention also comprises the use, as either or both of the metallic heat-imparting media, of an alloy of two or more high boiling metals such as, for example, mercury and cadmium. My invention comprises other subsidiary features that are hereinafter particularly described.

In the accompanying drawings, which illustrate a practicable apparatus for carrying out the process:

Fig. 1 is a side elevation largely diagrammatic and partially in section of such apparatus;

Fig. 1ª is a detail perspective view of a portion of the heat exchange member A; and Fig. 2 is a view similar to Fig. 1 of a modified form.

The vessel V, which contains the substance which is to be ultimately heated (or cooled), contains a heat exchange member A, which is shown as a special coil through which a fluid metal is adapted to circulate. From a boiler B, which also contains a fluid metal, a pipe M extends into one of the headers R of the coil A, and thus into heat exchange relation therewith, and returns to the boiler. Oil A is connected, through a pipe P, to a condenser C, condensate returning to coil A through a trap S connected to a vacuum pump (not shown). The vapors given off by the boiler B are controlled as to composition and pressure so as to be at a temperature exceeding, to the desired degree, the temperature of the metal contained in coil A, and sufficient, in the normal practice of the process, to maintain the contents of coil A at the boiling point.

Beyond condenser C, pipe P, or an extension thereof, extends to a water-cooled condenser WC, which comprises a jacket whose upper end is open, thereby preventing breakage, which occurs in closed jacket condensers due to unequal expansion of the two walls. Both walls of condenser WC at the point of contact at the bottom are cold and are of approximately the same temperature thus insuring tightness.

By controlling the actuation of a vacuum control valve X by means of the temperature within the vessel V, such temperature may be maintained approximately constant. By placing a thermostat T in vessel V, and connecting it with the valve X on the vacuum line, sudden evolution of heat in vessel V may be caused to open the valve X more fully and impress a higher vacuum on the fluid in coil A, thus lowering its boiling point, which in turn lowers the temperature of the fluid in coil A. Decrease of the temperature in coil A, with transfer of heat from vessel V to the boiling fluid in coil A, causes greater evolution of vapor and the dissipation of the excess heat into the reflux condenser. Conversely, a drop in the temperature of the contents of vessel V will effect a throttling of valve X and cause a rise in pressure in coil A, thus raising the boiling point of the fluid, which in turn raises its temperature.

Thus, it will be understood that when the substance in vessel V is being heated, the temperature of the heating medium (in coil A) may be raised while the substance is relatively cool, in order to facilitate the transfer of heat, and when the substance becomes heated to the desired temperature, it may be held from rising substantially above that temperature by a reverse transfer of heat. On the other hand, when the substance in vessel V is being cooled, the temperature of the cooling medium (in coil A) may be lowered while the substance is relatively hot in order to facilitate the transfer of heat, and when the substance becomes cooled to the desired temperature, it may be held from falling substantially below that temperature by a reverse transfer of heat. Referring more particularly to Fig. 2 in which similar letters of reference refer to the same parts as in Fig. 1, if desired a partition may be thrown across the vessel V near its bottom to form a jacket J in which heating medium from boiler B may collect for auxiliary direct heating of the material in vessel V.

The invention does not require the employment of any particular material for use as the heating medium in the primary circulating system (through pipe M) or in the secondary circulating system (through coil A). Different compositions may be used, or the two media may be of the same composition. In case the same composition is used for both media, the pressures in the two circulating systems would have to be substantially different in order to secure the desired differences in temperature, and the pressure difference provided would depend on the desired rate or amount of heat transfer. If the materials are of different compositions having different boiling points, the material having the higher boiling point should be used in the primary circulating system.

Various metals are capable of being used as the heat-transferring medium in either the primary circuit or the secondary circuit. Mercury vapor has boiling points at a low vacuum and superatmospheric pressures which makes it well adapted for certain purposes. Cadmium is particularly useful in processes involving very high temperature. By controlling the pressure to which the cadmium is subjected during vaporization, any desired high temperature may be obtained. With a high vacuum, a relatively low temperature may be obtained; for example, with a vacuum of twenty inches, a temperature of 550° C. may be obtained, while with a vacuum of 28 inches a temperature of 500° C. may be obtained.

I have found it practicable to secure any desired temperature within a wide range by mixing two or more metals of the group of metals that are available in carrying on these high temperature indirect heating operations. For example, the boiling point of cadmium at a given pressure may be depressed by the addition of another high boiling substance such as mercury. I have found that by this means, operation at comparatively low temperatures is practicable, which is more convenient, since low temperatures may be obtained with a lower absolute pressure than would otherwise be necessary, thereby avoiding the necessity of a high vacuum. The addition of another substance to cadmium has the added advantage of depressing the melting point of the cadmium so that it will be less likely to freeze in the circulating system. As an example, I have used a composition comprising 25–35% cadmium and 65–75% mercury. By means of such an alloy, it has been found possible to obtain a liquid with a melting point of from 110–140° C., which will, under 28¾ inches of vacuum, yield vapors with a temperature of from 260–280° C., which is much below the boiling point of cadmium alone (590° C. under that pressure). The melting point of cadmium is close to 321° C.

For some purposes, mercury may be added to cadmium with a high zinc content, or even to pure zinc, for the purpose of depressing its boiling point. One of the advantages of using the mercury-zinc composition is the relatively low cost of the component metals.

Cadmium containing varying percentages of zinc or other substances with which it usually occurs, and even in the composition ratio of its natural occurrence, may be used.

Lead or tin may be added to cadmium or zinc or mixtures thereof, or any of these substances may be added to mercury.

For various reasons, such as the prevention of losses and to facilitate control, it is advisable to operate under a vacuum. The preferred alloy, therefore, is one that will have the desired boiling point under a convenient vacuum.

I claim:

1. The process of effecting heat interchange which comprises establishing a circulation of a substance through a primary circuit and imparting heat to said substance to boil it at one region in the circuit, providing a secondary circuit containing a substance, transferring heat at another region of the primary circuit from the vapors in the primary circuit to the substance in the secondary circuit to effect boiling of the substance in the secondary circuit and condensation of vapors in the primary circuit, effecting an interchange of heat between the substance in the secondary circuit and a material with which heat is to be ultimately exchanged and controlling the pressure, and thereby maintaining substantially constant the temperature, in the secondary circuit by the temperature of the material with which heat is to be ultimately exchanged.

2. The process of effecting heat interchange which comprises establishing a circulation of a substance through a primary circuit and imparting heat to said substance to boil it at one region in the circuit, providing a secondary circuit containing a substance, transferring heat at another region of the primary circuit from the vapors in the primary circuit to the substance in the secondary circuit to effect boiling of the substance in the secondary circuit and condensation of vapors in the primary circuit, effecting an exchange of heat between the substance in the secondary circuit and a material with which heat is to be ultimately interchanged, maintaining in the secondary circuit a variable pressure less than atmospheric, and controlling such pressure by the temperature of said material so as to decrease said pressure with a rise of said temperature and increase said pressure with a fall of said temperature to the end that a substantially constant pressure will be maintained in the secondary circuit.

3. The process of effecting heat interchange which comprises establishing a circulation of a metallic substance through a primary circuit, imparting heat to said substance to boil it at one region in the circuit, providing a secondary circuit containing a metallic substance, transferring heat from the vapors in the primary circuit to the metallic substance in the secondary circuit to effect boiling of the metallic substance in the secondary circuit and condensation of vapors in the primary circuit, transferring heat from the metallic vapors in the secondary circuit to a material with which heat is to be ultimately exchanged and controlling the temperature of the metallic substance in the secondary circuit so as to maintain the temperature thereof substantially constant.

4. The process of effecting heat interchange which comprises establishing a circulation of a substance through a primary circuit and imparting heat to said substance to boil it at one region in the circuit, providing a secondary circuit containing a substance, causing the substance in the secondary circuit to flow in a stream in heat interchange relation with the substance in the primary circuit on one side and with a material with which heat is to be ultimately interchanged on the other side, and maintaining substantially constant the temperature of the substance in the secondary circuit.

In testimony whereof I affix my signature.

JUSTIN F. WAIT.